W. S. HARLEY.
MOTOR CYCLE LUBRICATION SYSTEM.
APPLICATION FILED SEPT. 13, 1918.

1,301,258.

Patented Apr. 22, 1919.
5 SHEETS—SHEET 4.

Witness
J. P. Britt

Inventor
William S. Harley
By Good Young
Attorney

W. S. HARLEY.
MOTOR CYCLE LUBRICATION SYSTEM.
APPLICATION FILED SEPT. 13, 1918.
1,301,258.
Patented Apr. 22, 1919.
5 SHEETS—SHEET 5.
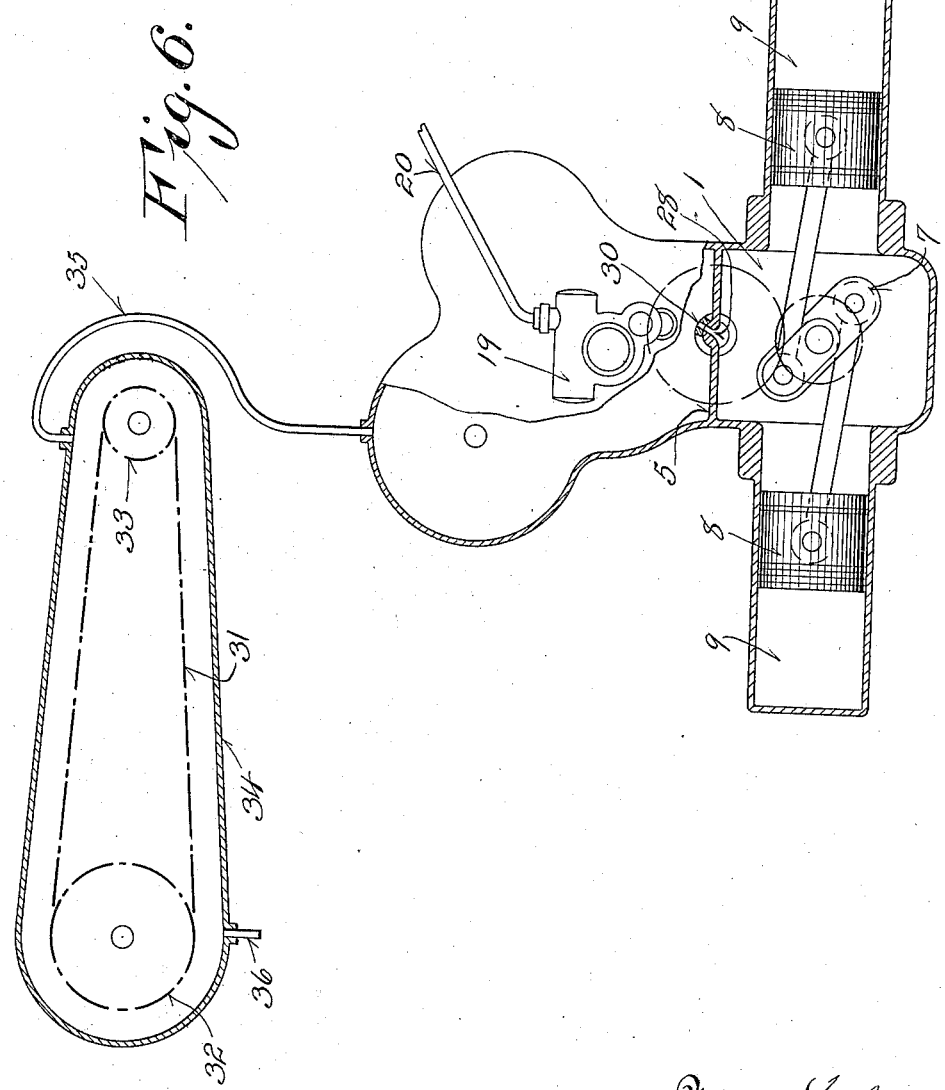

UNITED STATES PATENT OFFICE.

WILLIAM S. HARLEY, OF MILWAUKEE, WISCONSIN, ASSIGNOR TO HARLEY-DAVIDSON MOTOR COMPANY, OF MILWAUKEE, WISCONSIN.

MOTOR-CYCLE-LUBRICATION SYSTEM.

1,301,258.     Specification of Letters Patent.     Patented Apr. 22, 1919.

Application filed September 13, 1918. Serial No. 253,893.

*To all whom it may concern:*

Be it known that I, WILLIAM S. HARLEY, a citizen of the United States, and resident of Milwaukee, in the county of Milwaukee and State of Wisconsin, have invented certain new and useful Improvements in Motor-Cycle-Lubrication Systems; and I do hereby declare that the following is a full, clear, and exact description thereof.

This invention relates broadly to means for lubricating the principal operating parts of a motorcycle. The object of the invention is to procure maximum efficiency in lubrication by a minimum expenditure of lubricating fluid. In carrying out this object the motor is equipped with means for atomizing or otherwise finely dividing the lubricating oil so that the same will more readily reach all parts of the engine which are necessary to be so treated. In this connection not only are the pistons and cylinder walls oiled, but a thin film of lubricating fluid is sprayed onto all of the gears and the transmission mechanism.

An additional aim of the invention is to provide means for directing the atomized lubricating fluid from the motor onto the chain or other driving connection between the latter and the driving wheel of the motorcycle. This driving connection is inclosed in a suitable casing so that it is surrounded by a mist of said atomized oil.

With these and other objects in view the invention resides in certain novel features of construction, combination and arrangement of parts which will be hereinafter more particularly described and claimed and shown in the drawings in which:

Fig. 6 is a diagrammatic view of my lubricating system.

Figure 1:
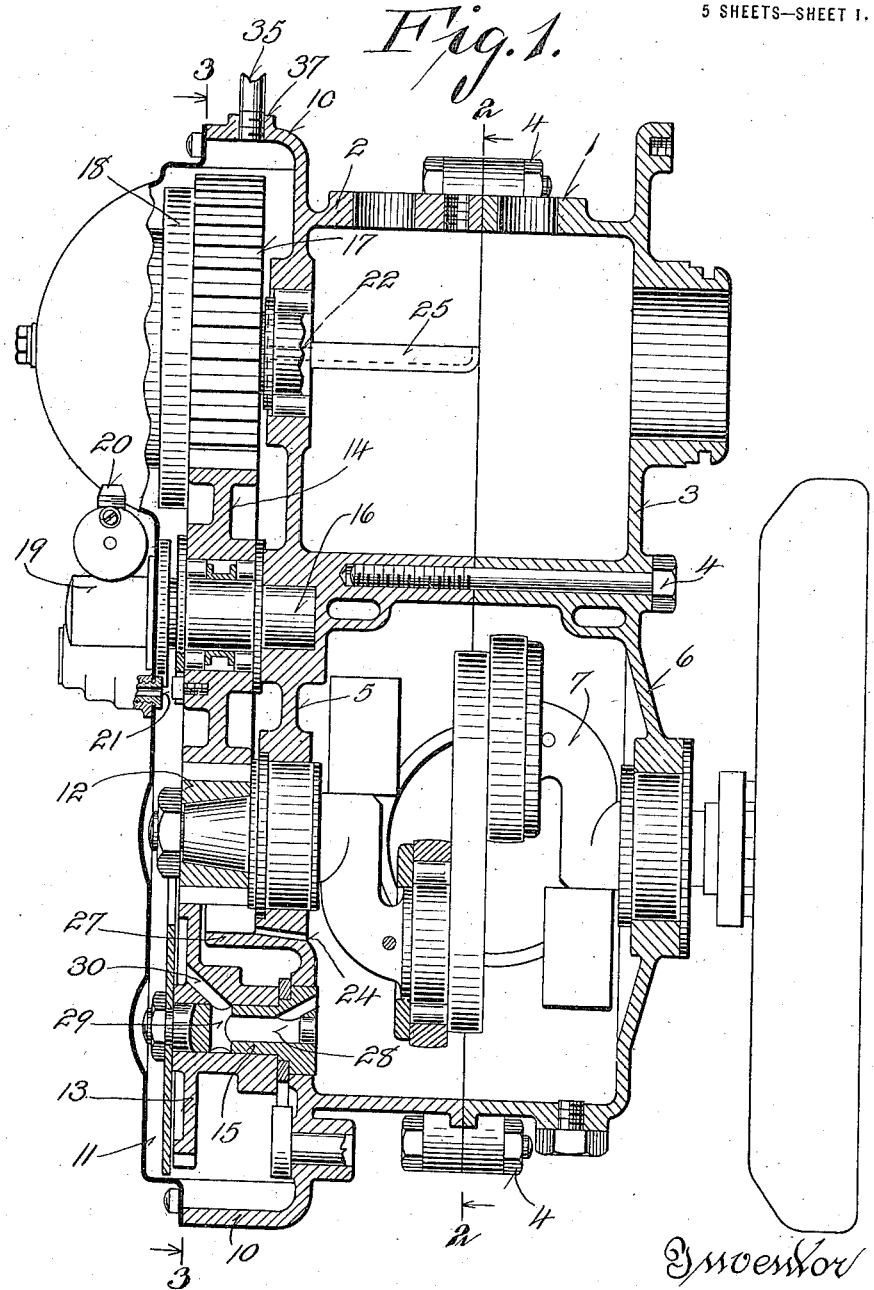
Figure 1 represents a substantially vertical transverse sectional view through a motor constructed in accordance with my invention, a number of the operating parts being omitted for convenience in illustration.

In the accompanying drawings my invention has been shown applied to an internal combustion engine of that general type illustrated in my copending application Serial No. 192,117, filed Sept. 19, 1917, in which the two cylinders are opposed and horizontally disposed. Referring therefore to the drawings in the present application it will be seen that the numeral 1 denotes a combined crank and transmission case formed of two castings 2 and 3 which are connected together by bolts or the like 4 and have alined openings in their opposite corresponding walls 5 and 6 in which the opposite ends of the crank shaft 7 are journaled.

From Fig. 1 it will be noted that these openings are located at the lower portion of the case 1 which forms the crank case proper; in the same walls at the upper portion of the case 1 are formed additional alined openings for the reception of the shaft of a transmission mechanism (not shown). From the front and rear walls within the crank case proper are provided cylindrical openings through which pistons 8 slide into opposed cylinders 9.

The casting 2 of the combined crank and transmission case 1 has a lateral flange 10 extending from the wall 5, said flange being adapted to define a gear case on which a gear case cover 11 is secured. The connection between the flange 10 and the cover 11 is oil and dust tight for the protection of the operating mechanism housed in the gear case.

One spindle of the crank shaft 7 extends into the gear case through the wall 5 and has secured thereon a main driving gear 12, the teeth of which are respectively meshed with the teeth of a cam gear 13 and an oil pump gear 14, both of the latter gears being journaled on stationary stub shafts 15 and 16 respectively. The oil pump gear is in turn meshed with a gear 17 which drives the shaft of the transmission mechanism and which forms a portion of a clutch 18.

The oil pump 19 operated by the gear 14 is of the type shown in my Patent No. 1254799, although it is obvious that any other or preferred pump may be used. Lubricating fluid is directed to said pump from a suitable reservoir (not shown) through a tube 20 and is discharged from the former through a vent 21 in the gear case cover 11.

The oil which is delivered into the gear case by the pump 19 is permitted to enter the combined crank and transmission case 1 through several small holes or ducts in the wall 5. Said holes or ducts are arranged in two vertically spaced series, that is to say ducts 22 and 23 are located in the upper portion of the wall 5 and on the opposite sides of the bearing opening in which the hereinbefore mentioned shaft of the transmission mechanism is journally mounted, and the second series of ducts 24 are substantially horizontally arranged and are disposed immediately below the opening in which one end of the crank shaft is journaled. The ducts 22 and 23 communicate respectively with catch pockets 25 and 26 formed integrally with the opposite walls of the casting 2, these pockets being of a length substantially equal to the distance of the wall 5 and the inner edge of said casting. The ducts 24 similarly communicate with a curved catch basin in the form of a laterally extending flange 27 which projects from the outer surface of the wall 5 and has its opposite ends secured to or formed integrally with the opposite portions of the flange 10.

Communication is also intermittently had between the interior of the case 1 and the gear case through the hollow stub shaft 15, the same being provided with a longitudinal passage-way 28 and a transverse passage-way 29. The cam gear 13 has a passage-way 30 extending inwardly from its outer face to its central bore whereby as the same is caused to rotate the passage-ways 29 and 30 will be successively brought into communication. These passage-ways 28, 29 and 30 are so located with respect to each other that their movement into and out of communication is synchronized with the movement of the pistons 8. In the present invention the passage-ways 29 and 30 are out of communication when the pistons are moving outwardly on their compression strokes.

Owing to the great rapidity of movement of the reciprocative and rotary parts of the engine located within the crank and transmission case 1 and the gear case, and the pulsation of air through the ducts 22, 23 and 24 and through the passage-ways 28, 29 and 30 caused by the movement of the pistons 8 the lubricating fluid which is fed into said gear case by the oil pump will be vaporized or atomized and thoroughly distributed through the two cases in the form of mist. As this atomized fluid condenses on the walls of the cases and on other parts, it will gradually collect and run down said walls or drip from said other parts. The catch pockets 25, 26 and 27 are therefore provided to trap the condensed oil and hold it adjacent the ducts 22, 23 and 24 where it may be most efficiently acted on by the pulsation of air and again atomized. The moving parts of the engine are thus continuously bathed in lubricating fluid.

Some of this atomized lubricating fluid is directed upon the sprocket chain or other driving connection disposed between the engine and the rear or driving wheel of the motorcycle, such driving connection being indicated diagrammatically in Fig. 6 as at 31, the same being trained around a sprocket wheel 32 fixed to said rear motorcycle wheel and a sprocket 33 driven by the engine. These last mentioned parts 31, 32 and 33 are inclosed in a dust tight housing 34 which has an inlet pipe 35 communicating with the interior thereof through its upper wall, and an outlet 36. Said pipe 35 is tapped into the top of the gear case as at 37.

As a result of this construction, upon each inward or explosion stroke of the pistons 8, air containing atomized lubricating fluid will be forced from the case 1, through the ducts hereinbefore referred to, into the gear case, and from there ejected through the pipe 35 onto the chain or driving connection 31. Although a very minute quantity of fluid is delivered into the housing 34 upon each of these occasions, said driving connection will be thoroughly lubricated owing to the frequency with which the movement of the oil charged air takes place. Upon movement of the pistons 8 on their compression strokes a limited quantity of air will be sucked into the engine from the housing 34.

Figure 2:
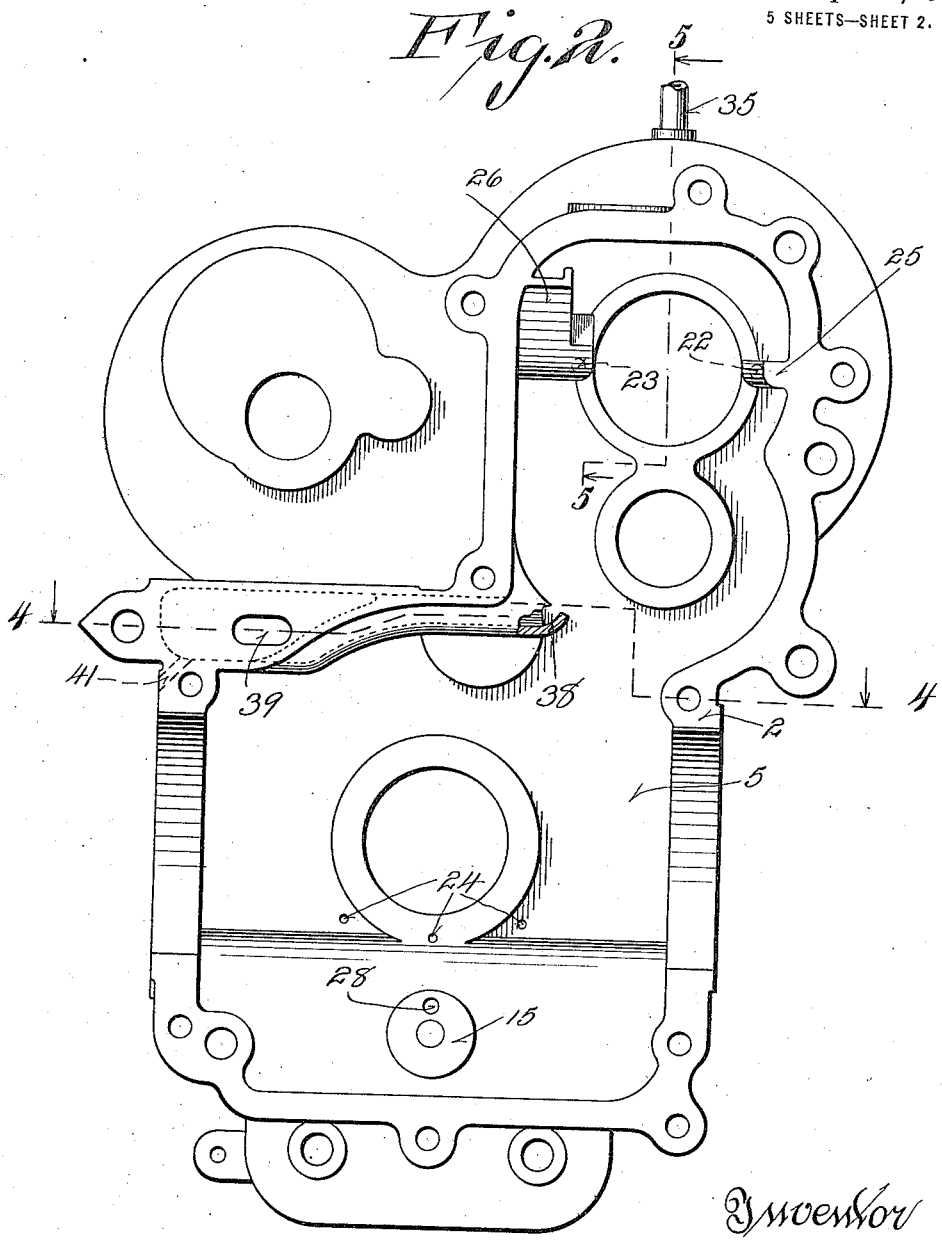
Fig. 2 is an inner elevational view of one section of the crank case of the motor shown in Fig. 1, the figure being viewed from the direction of the arrows on the section line 2—2 of Fig. 1.
Figure 3:
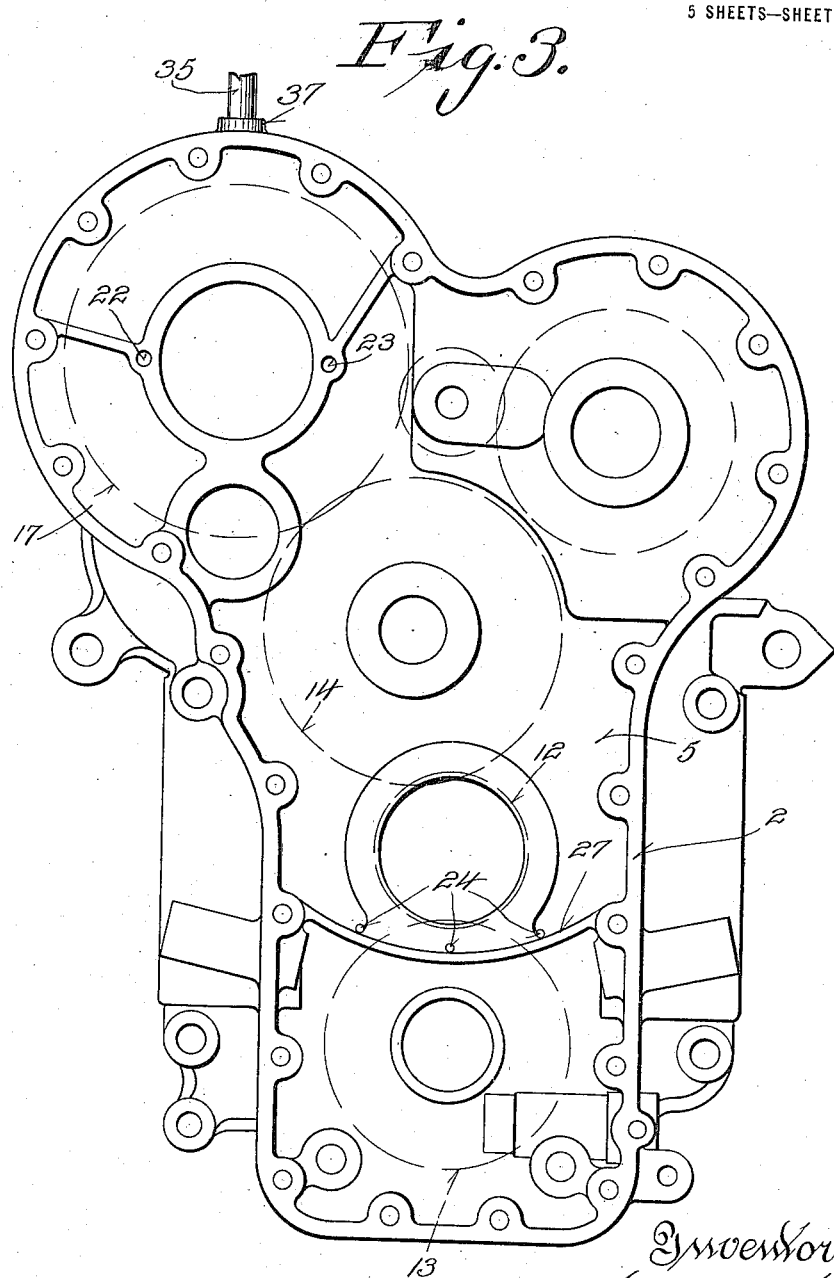
Fig. 3 is an outer elevational view of the same portion of the crank case looking in the direction of the arrows on the section line 3—3 of Fig. 1, both this and the last mentioned figure having the moving parts of the engine removed.
Figure 4:
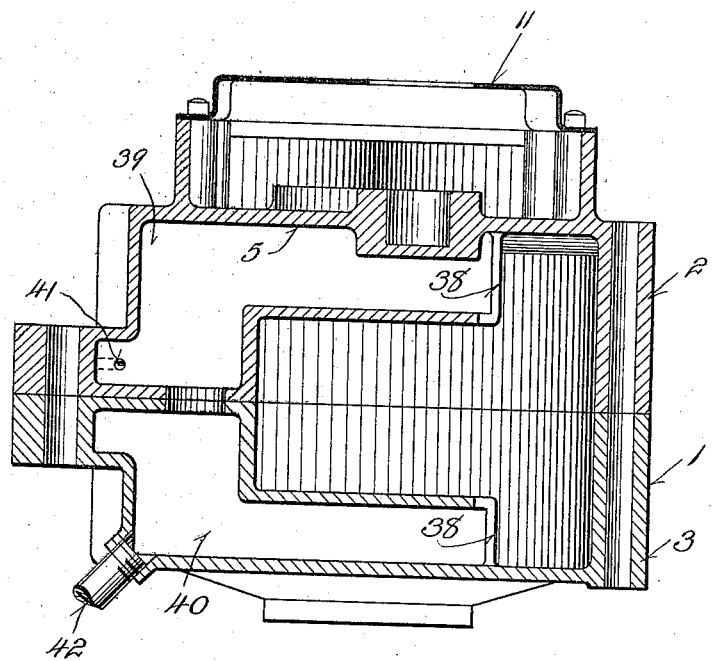
Fig. 4 is a horizontal section taken substantially on the plane of the line 4—4 of Fig. 2.
Figure 5:
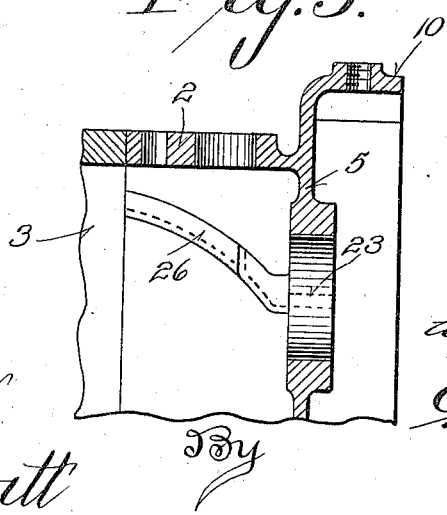
Fig. 5 is a detail sectional view on the plane of the line 5—5 of Fig. 2.

In addition to the oil pockets hereinbefore referred to, the case 1 is provided with additional catch pockets 38 from which condensed oil is directed into the parts 39 and 40 of a two compartment reservoir. As shown in Fig. 2 this reservoir is located at the top of the crank case proper. From the part 39 of the reservoir a duct 41 extends to one of the cylinders 9 whereby lubricating fluid is fed thereto by gravity. A return pipe 42 is tapped into the other compartments 40 of the reservoir.

I claim:—

1. In a motor lubricating system, an engine including a crank case, a cylinder, a piston therefor and a crank in said case, an oil supply chamber, a duct connecting the crank case and supply chamber, said duct being alternately opened and closed, oil being alternately sucked from the supply chamber to the crank case and forced from the latter to the former by the movement of the piston and thereby atomized, and means for synchronizing the opening and closing of said duct with the movement of the piston.

2. In a motor lubricating system, an engine including a crank case, a cylinder, a piston therefor, a crank in the case, an oil supply chamber disposed externally of the crank case, a pair of vertically spaced small ducts connected with the crank case and supply chamber, oil being alternately sucked from the supply chamber to the crank case and forced from the latter to the former by the movement of the piston and thereby atomized, and a catch pocket in the crank case adjacent the upper duct to trap oil which may condense on the wall of the crank case in the upper part thereof.

3. In a motor lubricating system, an engine including a crank case, a cylinder, a piston therefor, a crank in the case, an oil supply chamber disposed externally of the crank case, a pair of vertically spaced small ducts connected with the crank case and supply chamber, oil being alternately sucked from the supply chamber to the crank case and forced from the latter to the former by the movement of the piston and thereby atomized, a catch pocket in the crank case adjacent the upper duct to trap oil which may condense on the wall of the crank case in the upper part thereof, and a catch pocket in the supply chamber adjacent the lower duct to receive oil fed into said supply chamber.

4. A motor lubricating system, an engine including a crank case, a cylinder, a piston therefor, and a crank in the case, an oil supply chamber disposed externally of the crank case, a pair of spaced ducts connecting the crank case and supply chamber, one of said ducts being alternately opened and closed, oil being alternately sucked from the supply chamber to the crank case and forced from the latter to the former by the movement of the piston and thereby atomized, and means for synchronizing the opening and closing of the last mentioned duct with the movement of the piston.

5. A motor lubricating system, an engine including a crank case, a cylinder, a piston therefor, and a crank in the case, an oil supply chamber disposed externally of the crank case, a duct connecting the crank case and supply chamber, said duct being alternately opened and closed, oil being alternately sucked from the supply chamber to the crank case and forced from the latter to the former by the movement of the piston and thereby atomized, means for synchronizing the opening and closing of the said duct with the movement of the piston, said duct being closed on the compression stroke of the piston and open on the expansion stroke.

6. In a motor lubricating system, an engine including a crank case, a cylinder secured thereto, and a piston, a lubricating fluid supply means connected with the crank case, means for atomizing the lubricating fluid in said crank case, a catch pocket in said crank case to receive the condensed lubricating fluid from the walls of the latter, and a duct extending from the pocket to the interior of said cylinder.

7. In a motor cycle lubricating system, a driven wheel, a motor, a driving connection between the wheel and the motor, means for supplying lubricating fluid to the motor, means for atomizing the lubricating fluid, and means for directing the atomized fluid onto the driving connection to lubricate the same.

8. In a motorcycle lubricating system, a driven wheel, a motor, a driving connection between the wheel and the motor, means for supplying lubricating fluid to the motor, means for atomizing the lubricating fluid, and means for intermittently ejecting atomized fluid from the motor onto the driving connection to lubricate the same.

9. In a motorcycle lubricating system, a driven wheel, a motor, a driving connection between the wheel and the motor, a dust tight casing, surrounding the driving connection, means for supplying lubricating fluid to the motor, means for atomizing the lubricating fluid, and a pipe extending from the motor to the casing to direct the atomized lubricating fluid onto the driving connection.

10. In a motorcycle lubricating system, a driven wheel, a motor including a crank case, a cylinder, a piston therefor, and a crank in the case, a driving connection between said wheel and the crank, an oil supply chamber disposed externally of the case, a plurality of small ducts connecting the crank case and the supply chamber, oil being alternately sucked from the supply chamber to the crank case and forced from the latter to the former by the movement of the piston and thereby atomized, and means for directing a portion of the atomized lubricating fluid from the motor upon said driving connection.

11. In a motorcycle lubricating system, a driven wheel, a motor including a crank case, a cylinder, a piston therefor, and a crank in the case, a driving connection between said wheel and the crank, an oil supply chamber disposed externally of the case, a pair of spaced ducts connecting the crank case and supply chamber, one of said ducts being alternately opened and closed, oil being alternately sucked from the supply chamber to the crank case and forced from the latter to the former by the movement of the piston and thereby atomized, means for intermittently directing atomized fluid onto said driving connection from the motor, and means for synchronizing the opening and closing of the last mentioned duct with the movement of said piston.

12. The herein described method of motorcycle lubrication which consists in atomizing the lubricating fluid in the engine, and thereafter directing the atomized fluid on to the driving connection between the engine and the driving wheel by the pulsations resulting from the movement of the engine piston.

In testimony that I claim the foregoing I have hereunto set my hand at Milwaukee, in the county of Milwaukee, and State of Wisconsin.

WILLIAM S. HARLEY.

Copies of this patent may be obtained for five cents each, by addressing the "Commissioner of Patents, Washington, D. C."